United States Patent [19]

Bitzel

[11] 4,384,621
[45] May 24, 1983

[54] DEVICE FOR BEVELING A WORKPIECE EDGE

[75] Inventor: Hubert Bitzel, Ditzingen, Fed. Rep. of Germany

[73] Assignee: Trumpf Maschinen AG, Switzerland

[21] Appl. No.: 232,588

[22] Filed: Feb. 9, 1981

[30] Foreign Application Priority Data

Feb. 9, 1980 [DE] Fed. Rep. of Germany ....... 3004881

[51] Int. Cl.³ .......................... B23D 7/00; E21C 9/00
[52] U.S. Cl. ........................................ 173/32; 30/168;
83/581; 83/916; 144/126; 409/296
[58] Field of Search ................... 144/124, 126, 134 D;
83/581, 916, 869; 409/303, 138, 180, 296, 293;
145/26; 30/168; 173/32

[56] References Cited

U.S. PATENT DOCUMENTS

| | | | |
|---|---|---|---|
| 2,661,663 | 12/1953 | Brinkman | 409/296 |
| 3,192,835 | 7/1965 | Leibinger | 83/581 X |
| 3,523,475 | 8/1970 | Leibinger | 83/916 X |
| 3,530,763 | 9/1970 | Grimm | 409/303 X |
| 3,847,049 | 11/1974 | Bitzel | 83/916 X |

Primary Examiner—W. D. Bray
Attorney, Agent, or Firm—McGlew and Tuttle

[57] ABSTRACT

A device for cutting an edge of a workpiece comprising, a drive head having a carrier, a support bracket connected to the drive head for fixing the drive head with respect to the working piece edge, a tool holder reciprocately movable in and by the drive head, an impact cutting tool connected to the tool holder for cutting the workpiece edge, and a guide sleeve rotatably mounted but fixable in position in the carrier for guiding the motion of the cutting tool. The guide sleeve is rotatable to rotate the cutting tool and bring different edges thereof into a cutting position. Depending on the shape of the cutting tool, a plurality of edges are provided which can be changed as they become dull by rotating the guide sleeve. The axis of a cutting end of the impact tool can also be offset from an axis of the sleeve and an axis of a clamping end of the cutting tool connected to the tool holder to vary the depth at which the edge of the workpiece is cut. This is possible since different edges of the impact tool, when brought into their cutting positions, cut at various depths into the workpiece.

16 Claims, 5 Drawing Figures

M 2:1

M 2:1

M 2:1

DEVICE FOR BEVELING A WORKPIECE EDGE

FIELD AND BACKGROUND OF THE INVENTION

The present invention relates in general to a workpiece cutting device and, in particular, to a new and useful device for beveling or cutting away the edge of a workpiece using a reciprocally moving tool moved by a drive head connected to the workpiece by a workpiece support arrangement.

In a prior art device of this kind, the adjustable workpiece support as well as a brace for the workpiece edge to be machined and, if provided, a hold-down opposite to the support, are mounted on a bracket. During operation, this device is engaged over the workpiece with the bracket being open to one side. The impact tool cuts a chip from the workpiece edge at every working stroke. The size of these chips, which are each in the shape of a triangular prism, depends on how far the workpiece edge projects into the range of motion of the cutting end of the tool. As a rule, such devices are employed to make one or more triangular or beveled welding edges on plate-shaped workpieces. Such welding edges are provided to facilitate welding the workpiece to other workpieces. Advantageously, both the support of the workpieces and the brace as well as the usually provided hold-down are adjustable to adapt especially to various thicknesses of workpieces, and also to change the width of the bevel.

To machine a flat bevel in steps, at least the cutting and face turned to the workpiece must be planar, so as to obtain a straight cutting edge. The lateral forces acting on the tool are very strong, so that the tool must be guided close to the cutting area. For reasons of stability, the clamping end of the tool has a larger cross section than the cutting end. Further, because of the tool holder, the cross sectional shape of the cutting end differs from that of the clamping end, as a rule. Usually, the cutting end has a rectangular cross section while the cross section of the clamping end is circular. The tool is subjected to wear and must periodically be reground or sharpened. For this purpose it must be removed from the tool holder. With the prior art device, this is possible only upon disassembling the entire bracket with the brace, the support, and the hold-down.

SUMMARY OF THE INVENTION

The present invention is directed to an improvement in the device of the aforementioned kind. The inventive device permits an exchange of the tool, quickly and without disassembling the mentioned parts and while preserving a secure guidance and hold of the tool.

An object of the present invention is to provide a device for cutting an edge of a workpiece comprising, a drive head having a carrier, support means connected to the drive head for fixing the drive head with respect to the workpiece edge, a tool holder reciprocally movable in and by the drive head, an impact cutting tool having a clamping end connected to the tool holder and a cutting end for cutting the edge of the workpiece, a guide sleeve having an opening for receiving and guiding the tool cutting end, rotatably mounted to the carrier, and securing means connected to the carrier and sleeve for fixing the position of the sleeve with respect to the carrier.

Due to this design, the guide sleeve can be removed if needed, and the opening thus cleared in the carrier is sufficient for removing the tool at the same time, or later. The support bracket means or bracket and the parts secured thereto may remain in place during this operation which is advantageous since it becomes unnecessary to design the bracket as a removable structure. The bracket may thus be firmly secured to the carrier. Manufacturing costs are thereby reduced and the strength of the device in this region is increased. Since the guide sleeve guides the tool in the cutting zone, it also undergoes some wear. In this regard a further advantage of the invention becomes manifest, namely that if this guide is worn down, it suffices to exchange the relatively small and therefore, inexpensive part, while in the prior art device, the entire bracket must be exchanged in such a situation.

According to a development of the invention, the guide sleeve projects from the carrier in the direction of the workpiece support, and is mounted in the carrier for rotary motion and can be fixed in position therein. The cutting end of the tool is designed as a polygonal bar as already mentioned. This means that with a rectangular cross section, for example, four cutting edges are formed at right angles to each other. At least two of these four edges remain unstressed during the operation, and are thus not subjected to wear. If now the guide sleeve can be rotated and fixed in the carrier as disclosed, and the cutting edge become blunt, the tool can be turned through 90° for example and fixed again so that a new edge is ready for cutting. It must be ensured of course by a corresponding design or other parts, that the clamping end of the tool can also be rotated.

The polygonal shape of the cutting end offers the possibility of turning the tool directly into another position. To avoid any damages, however, it is particularly advantageous to provide the projecting end portion of the guide sleeve with grip grooves, bores, turn faces, knurled portions etc., so as to be able to turn the tool indirectly, by means of the guide sleeve.

Another advantageous feature of the invention is to provide the clamping end of the tool with a securing thread to be engaged in a corresponding thread of the tool holder. This particularly facilitates the turning of the tool by one edge, if the preceding edge became blunt. No special clamping device is then required for the clamping end of the tool and the necessity of unclamping prior to turning the tool is eliminated at the same time. An uncontrolled turning of the tool during operation is prevented by the guide sleeve.

Another object of the invention is to provide such a device for cutting an edge of a workpiece wherein the tool is polygonal in shape and has a plurality of cutting edges, the tool being mounted in the sleeve at a position so that the axis of the cutting end of the tool is offset with respect to the axis of rotation of the guide sleeve so that the edges are at unequal spacing from the rotational axis of the guide sleeve. The axis of the clamping end of the tool is aligned with the rotational axis of the guide sleeve so that the tool can be rotated by rotation of the guide sleeve to bring a different cutting edge to a position to cut the workpiece edge to different depths.

This makes it possible thus to utilize the turning of the tool for another purpose as as well. That is, if the tool is turned to the next edge, this edge which now becomes the cutting edge comes closer to, or gets further from, the workpiece edge to be machined, depending on the direction of rotation of the tool. This makes it easy to machine the workpiece roughly in a first position of the tool, and to finish it in a second position thereof, while enlarging the bevel. On the other hand, this design simplifies the construction in the zone of the workpiece support, which may then be made unadjustable while at the same time preserving the possibility of producing bevels of varying widths.

In another variant of the invention with a pin-shaped clamping end of the tool, the tool is provided with at least two cutting edges which are unequally spaced from the clamping end. The position relative to the workpiece of the cutting edge in the stroke direction can then be changed quickly and without problems by simply turning the tool. Especially with thin workpieces, this measure makes it possible to provide the severing of the chip at the beginning, the middle, or the end of the working stroke. Particularly in the last mentioned instance, a relatively long period of time is then left for displacing the device laterally through a necessary distance after the working stroke, if the device is designed as a hand operated tool. Aside from this, of course, in this design again, the impact tool may be turned to the next cutting edge if the preceding one became blunt and the other preconditions are met.

A further object of the invention is to provide a cutting device for the edge of workpieces which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
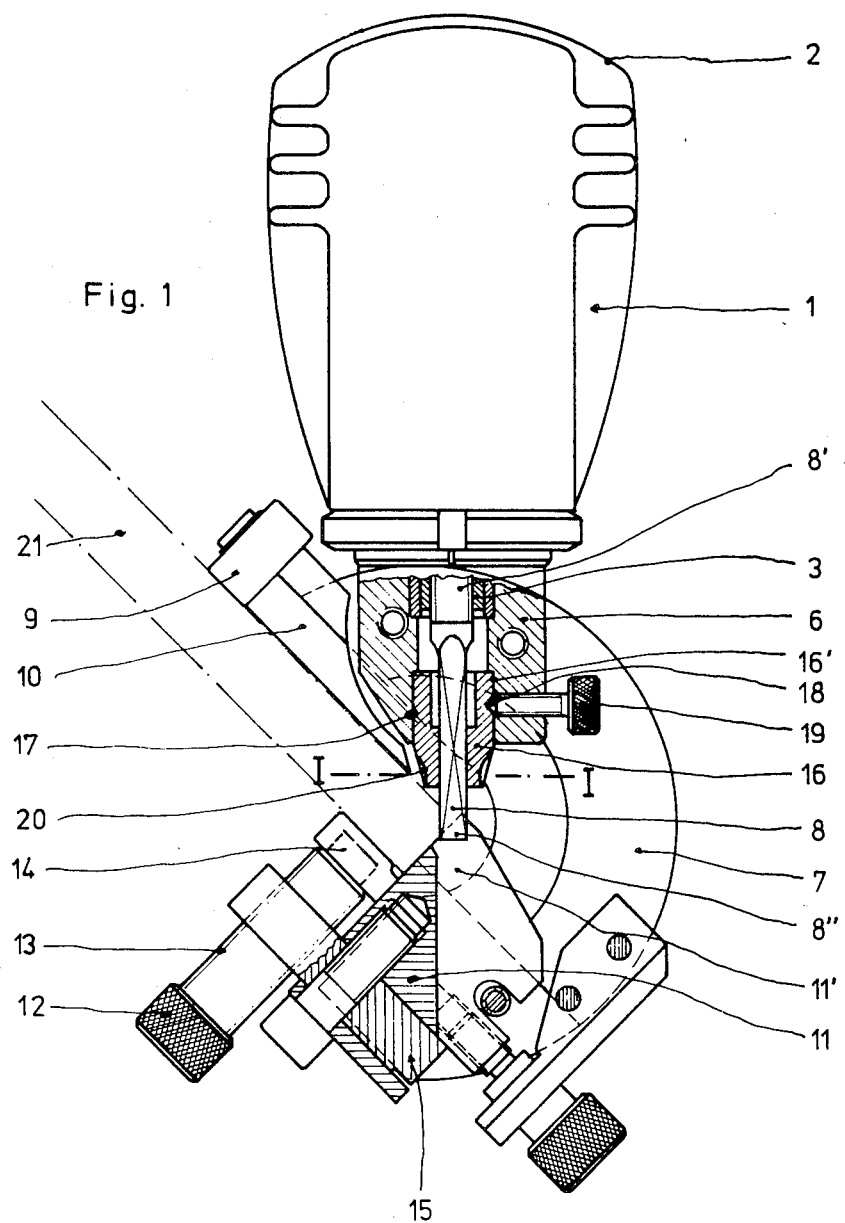
FIG. 1 is a side elevation of the inventive device partly in section in the plane of the longitudinal axis of the tool.
Figure 2:
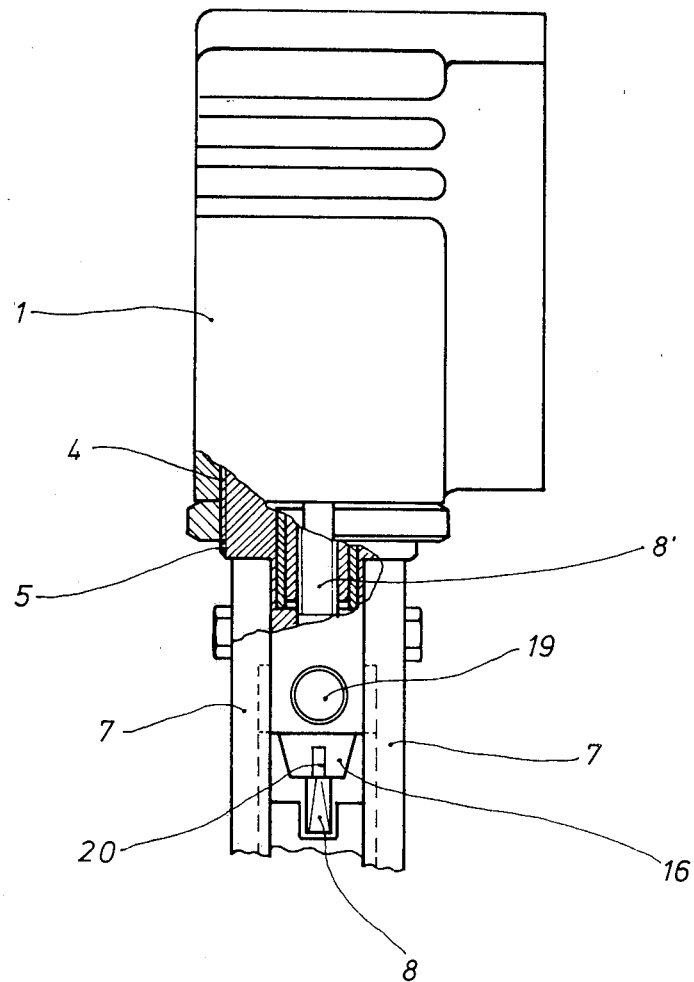
FIG. 2 is a front view of the device according to FIG. 1, partly in section.

Turning to the drawings in particular, the invention embodied therein, FIGS. 1 and 2 comprise a driving head generally designated 1 which has known machinery therein for reciprocally moving a tool carrier 3 upwardly and downwardly as viewed in FIG. 1. An impact or cutting tool 8 is fixed to the tool holder so that it reciprocates upwardly and downwardly into engagement with the edge of a workpiece 21 to cut the edge to selected depths.

In the drive head 1 of a mechanically driven device 2, a reciprocating motion is imparted to a tool holder 3 through an eccentric (not shown). Drive head 1 is provided with an internal thread 4 into which an external thread 5 of a carrier 6 is screwed. Two guide plates 7 are secured to carrier 6. At least in the first embodiment, the impact tool 8 has a circular cross section at its clamping end 8' which is threaded, and a rectangular cross section at the cutting end 8". The clamping end of the tool is screwed into a thread of tool holder 3. Should the clamping end be designed as a pin, it must be fixed in some way, such as by clamping screws or the like. The two guide plates 7 carry a hold-down 10 which is provided with a roller 9, and a brace 11 which is provided with a recess 11' for the tool 8 which moves therein and for the removal of chips cut from the workpiece 21. The workpiece support 21 is designed as a supporting plate 14 provided on the upper end of a spindle 13. Spindle 13 can be screwed into a plate 15 which is connected to brace 11.

A guide sleeve 16 is received in carrier 6 and has a cylindrical outer surface 16'. Sleeve 16 is fit for rotary motion in a bore 17 of the carrier. On its surface 16', guide sleeve 16 is provided with a plurality of notches 18. In its operating position, the tip of a securing element 19 engages a respective notch 18. Securing element 19 may be a screw, for example. The lower portion of guide sleeve 16 may be provided with grip grooves 20, etc. facilitating the turning of the sleeve. The workpiece 21 is indicated in dash dotted lines.

Figure 4:
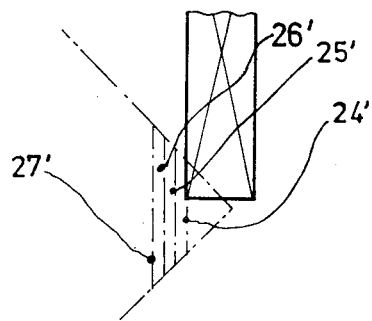
FIG. 4 is an enlarged view of the cutting end of the tool having edges which are to be unequally spaced from the workpiece.
Figure 3:
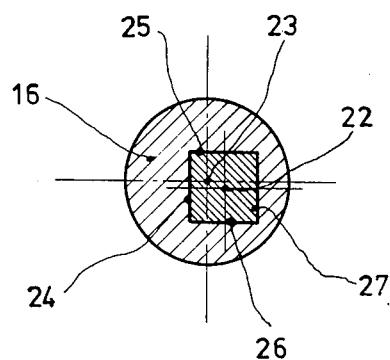
FIG. 3 is an enlarged sectional view taken along the line 1—1 of FIG. 1.

In the embodiment of FIG. 3, the central axis 22 of cutting end 8" having a rectangular cross section is offset relative to the central axis 23 of guide sleeve 16, so that the cutting faces 24, 25, 26, 27 of tool 8 extend at unequal distances from central axis 23 of the guide sleeve. The bevels or cuts 24', 25', 26', 27' which can be cut by means of the mentioned cutting edges or faces are shown in FIG. 4. These different cuts are achieved by rotating sleeve 6 to various positions of the tool 8.

Figure 5:
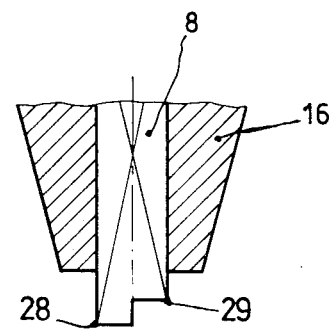
FIG. 5 is an equally enlarged longitudinal sectional view of the free end of the guide sleeve and the cutting end of a tool displaceable therein, showing the clamping end of the tool, as well.

In the embodiment of FIG. 5, the cutting edges 28 and 29 are equally spaced from the central axis of guide sleeve 16, however, they are provided at different levels with respect to the axis. This makes it possible to vary the position they occupy during the stroke by simply turning guide sleeve 16, so that there is no need for providing a thread on tool 8, that is its clamping end 8a which is thus pin-shaped and unequally spaced from edges 28, 29.

Brace 11 can be adjusted relative to guide plate 7 by means of a thread spindle 30. This may facilitate the insertion of the tool. Rotation of spindle 10 thus moves brace 11 with respect to guide plate 7.

Accordingly, the mechanism within driving head 1 reciprocally moves tool holder 3 which in turn moves the impact tool 8 upwardly and downwardly as shown in FIG. 1. This motion is guided by sleeve 16 which guides the cutting end 8" of tool 8. Since the axis of rotation of guide sleeve 16 is aligned with the axis of the clamping end 8' of impact tool 8, the guide sleeve can be freely rotated when securing element 19 is loosened to bring a different edge of tool 8 into position to cut the edge of workpiece 21. Carrier 6 is fixedly secured to the drive head 1 and, in known fashion, guides the motion of reciprocally moving tool holder 3.

While specific embodiments of the invention have been shown and described in detail to illustrate the application of the principles of the invention, it will be understood that the invention may be embodied otherwise without departing from such principles.

What is claimed is:

1. A device for cutting an edge of a workpiece comprising:
   a drive head having a carrier;
   support means connected to the drive head for fixing the drive head in position with respect to a workpiece edge;
   a tool holder reciprocately movable in and by said drive head;
   an impact cutting tool having a clamping end connected to said tool holder and a cutting end for cutting an edge of a workpiece;
   a guide sleeve having an opening for receiving and guiding said tool cutting end, rotatably mounted to said carrier; and
   securing means connected to said carrier and said guide sleeve for fixing the position of said guide sleeve with respect to said carrier.

2. A device according to claim 1, wherein a portion of said guide sleeves extends outwardly beyond said carrier.

3. A device according to claim 2, wherein said projecting portion of said guide sleeve includes means for gripping said guide sleeve to facilitate rotation thereof in said carrier.

4. A device according to claim 1, wherein said tool holder includes internal threads, said clamping end of said tool having external threads threaded into the internal threads of said tool holder to secure said tool to said tool holder.

5. A device according to claim 1, wherein said tool has a plurality of cutting edges distributed around an axis of said tool cutting end.

6. A device according to claim 5, wherein said axis of said tool cutting end is offset with respect to an axis rotation of said sleeve, an axis of said tool clamping end being aligned with said axis of rotation of said guide sleeve, whereby rotation of said guide sleeve brings each of said edges of said tool cutting end into different positions with respect to an edge of a workpiece fixed with respect to said drive head.

7. A device according to claim 1, wherein said cutting end of said tool has at least two cutting edges unequally spaced from said clamping end.

8. A device according to claim 1, wherein said support means comprises a guide plate connected to said carrier, a spindle receiving plate connected to said guide plate, a spindle threadably mounted into said spindle receiving plate, said spindle rotatable to clamp one end of a workpiece, and a hold-down element connected to said guide plate engageable against an opposite side of a workpiece.

9. A device according to claim 8, including a brace member slidably mounted to said guide plate and a second threaded spindle threaded to said guide plate and engaged with said brace member so that said brace member can be moved into engagement with an edge of a workpiece.

10. A device according to claim 9, wherein said brace member has a recess positioned to receive said impact tool.

11. A device for beveling a workpiece edge, comprising, a guided impact tool having a cutting end designed as a polygonal bar, a drive head for reciprocately moving the tool, a tool holder connected between a clamping end of the tool and the drive head, carrier secured to the drive head, a removable sleeve movably mounted to said carrier and forming a guide sleeve for guiding the motion of said tool, at least a part of an interior of the sleeve designed for guiding the cutting end of the impact tool, and a workpiece support for holding a workpiece in position with respect to said drive head.

12. A device according to claim 11, wherein the guide sleeve projects from the carrier in the direction of the workpiece support and is rotatable in the carrier and fixable therein.

13. A device according to claim 11, wherein a projecting portion of the guide sleeve is provided with grip groove means for facilitating the turning of said guide sleeve.

14. A device according to claim 11, wherein the impact tool is provided at its clamping end with a securing thread engaging a matching thread of the tool holder.

15. A device according to claim 13, wherein the tool has a plurality of cutting edges, the cutting edges of the cutting end of the tool being unequally spaced from an axis of rotation of the guide sleeve in the carrier, the axis of the guide sleeve being coaxially with an axis of the clamping end of the tool.

16. A device according to claim 12, wherein the tool has a pin-shaped clamping end, the impact tool having at least two cutting edges which are unequally spaced from the clamping end thereof.

* * * * *